I. LANGMUIR.
METHOD OF PRODUCING VACUUMS.
APPLICATION FILED MAY 15, 1914.

1,237,210.

Patented Aug. 14, 1917.

Witnesses:
George W. Tilden
J. Ellis Glenn

Inventor:
Irving Langmuir,
by Albert G. Davis
His Attorney.

# UNITED STATES PATENT OFFICE.

IRVING LANGMUIR, OF SCHENECTADY, NEW YORK, ASSIGNOR TO GENERAL ELECTRIC COMPANY, A CORPORATION OF NEW YORK.

METHOD OF PRODUCING VACUUMS.

1,237,210.  Specification of Letters Patent.  Patented Aug. 14, 1917.

Application filed May 15, 1914. Serial No. 838,768.

*To all whom it may concern:*

Be it known that I, IRVING LANGMUIR, a citizen of the United States, residing at Schenectady, county of Schenectady, State of New York, have invented certain new and useful Improvements in Methods of Producing Vacuums, of which the following is a specification.

The object of the present invention is to secure a rapid and complete evacuation of an inclosed space, and while of particular importance in the preparation of electron discharge devices is applicable to any apparatus where a high vacuum is desired.

In accordance with my invention I utilize the chemical affinity of tungsten or other refractory metal of low vapor pressure for gases when in a vaporized state. With this end in view a tungsten conductor is actively vaporized in the space to be evacuated, in some cases with the coaction of a reducible material, such as an oxid of phosphorus, to remove a part of the hydrogen which is rendered chemically active but is not completely removed by the incandescent tungsten vapor.

Figure 1:
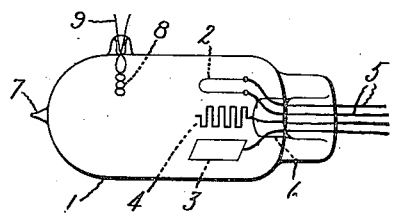
Figure 2:
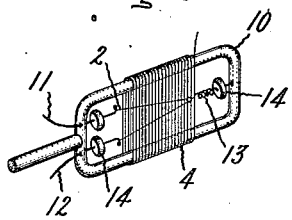
Figure 3:
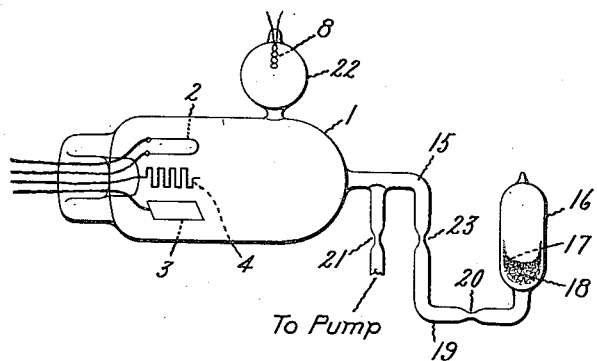

In the accompanying drawings, Figure 1 illustrates diagrammatically an electron discharge apparatus provided with an auxiliary filament for removing gases; Fig. 2 illustrates a construction which enables using the cathode of an electron discharge apparatus for furnishing vaporized metal; and Fig. 3 illustrates an apparatus for removing hydrogen as well as other gases.

In addition to mechanical pumping, gases may be removed from a space to be evacuated by the following methods:

*a*—Electrical precipitation,
*b*—Electrochemical action,
*c*—Chemical combination.

(*a*) As an example of the electrical method may be mentioned the well-known improvement in vacuum observed in an X-ray or Geissler tube, or the exhaust method described in Thatcher Patent #1,028,636, according to which advantage is taken of the blue glow, or haze, produced by a discharge through rarefied gas. This method does not lead to as high a vacuum as the present method and the gas may be driven back into the evacuated space by heating the envelop.

(*b*) When a discharge is passed between suitable terminals through the gas to be removed an electrochemical action may be observed. For example, when a discharge takes place between magnesium electrodes in a rarefied atmosphere a rapid clean-up of gas takes place but this method also has limitations as even the highest voltages will not produce a discharge when the gas pressure is reduced to below about .001 mm. of mercury.

(*c*) As an example of purely chemical method of fixing gases, the use of vaporized calcium may be mentioned. Not only is this method accompanied with serious practical difficulty, as the vaporizing temperature and the fusing point of calcium lie close together but it is also less effective for removing gases than the present method.

In Fig. 1 an electron discharge apparatus has been shown but it is to be understood that my new method of removing gases is applicable to other types of devices in w .ch a high vacuum is desirable. The inclosing envelop 1 consists of glass, or quartz. An incandescible cathode 2, an anode 3, and a discharge controlling grid 4, are diagrammatically indicated. The leading-in wires 5 are sealed into a stem 6 in the usual manner. The space in the envelop is given a preliminary evacuation by the most approved method of incandescent lamp exhaust, which preferably includes heating the envelop during pumping to remove water vapor. To drive gas out of the anode 3, the cathode 2 is made incandescent by passage of current, and the cathode and anode are connected respectively to the negative and positive terminals of a source of direct current, the voltage at first being low so that little blue glow is observable and being subsequently gradually increased as gas is removed. This method is fully described and claimed by me in a copending application, Serial No. 795,610, renewed as application Serial No. 84,242 on March 14, 1916, which is now involved in interference. When the pressure has been reduced to about .0001 mm. the envelop is sealed off as indicated at the tip 7, but it is not necessary to go below .0500 mm. The conductor 8, consisting of highly refractory metal also provided with sealed-in lead wires 9, is then heated by a suitable current to a temperature at which the metal is actively vaporized. Ordinarily when tungsten is used a temperature of about 2700° to 2900° C. is sufficient.

I have found that the vaporized metal removes carbon monoxid, carbon dioxid, oxygen and nitrogen completely, but will remove only limited quantities of hydrogen. The remaining hydrogen is converted to a highly active chemical state which makes possible its complete removal by chemical means hereinafter described.

In some cases it is not necessary to provide a separate conductor of tungsten or the like to furnish vapor for the removal of gases but instead a conductor having other functions such as the cathode 2 of the electron discharge apparatus may also serve the purpose of furnishing vaporized metal. In this case it may be necessary to provide special means to prevent the formation of a continuous conducting film between some of the electrical elements of the device. A structure suitable for this purpose is shown in detail in Fig. 2, which is a fragmental view of the cathode and the grid indicated diagrammatically in Fig. 1. The cathode 2 is supported between a frame 10 of glass, or other suitable insulating material, upon which is wound with closely adjacent turns a wire, also preferably consisting of tungsten, which constitutes the grid 4. The cathode wire 2 is attached as usual to leading-in conductors 11 and 12 at its terminals and its bight by a spring 13, the end of which is sealed into a frame 10. Upon the wires 11 and 12 and at the end of the spring 13 are placed small disks or buttons 14 of glass, or other suitable material, which prevent the deposition of vaporized tungsten on the part of the frame directly shielded by them. In other words these disks, so to speak, cast shadows upon the frame when the cathode 2 is heated to intensive incandescence as the vaporized metal travels outward in straight lines and is deposited on a surface on which it impinges. As the turns of the grid are all at the same potential it is immaterial whether or not tungsten is deposited between turns on the support. Instead of tungsten certain other refractory metals such as molybdenum and tantalum may also be used, and I desire these metals to be considered as equivalents to tungsten.

When it is desired to remove the residue of hydrogen from the evacuated chamber, provision is made for admitting a reducible material, for example, oxid of phosphorus into the envelop while the refractory metal is being vaporized. An apparatus suitable for carrying out this modification of the process is shown in Fig. 3. As illustrated, the main envelop 1 is connected by means of tube 15, to the chamber 16 containing a small amount of anhydrous phosphorous pentoxid 17 supported on glass wool 18, or any other suitable manner. The apparatus is exhausted in the usual manner and all parts, except the chamber 16, are thoroughly baked out during the exhaust. During the exhaust the cathode 2 is preferably heated to remove gas and the anode 3, and also the grid 4 if desired, subjected to electron bombardment to remove gas. When a good vacuum has thus been obtained by approved methods the bulb 16 is heated to distil phosphorous pentoxid over into section 19 of the connecting tube. The bulb 16 may then be sealed off at the contraction 20. The apparatus is now sealed off the pump at 21. The auxiliary filament 8, which in this case is placed in a side chamber 22, is now heated to a temperature effective to actively vaporize metal and thereby as already explained all of the gases, except part of the hydrogen, and possibly traces of rare gases, such as argon, are removed. To remove the residue of active, atomic hydrogen some of the pentoxid or phosphorus is distilled over into the main envelop by slightly warming tube 19. In some cases enough of the oxid distils at room temperature to remove a small amount of residual hydrogen. Oxid of phosphorus reacts with the hydrogen to form water vapor which is taken up by the residue of oxid of phosphorus in the tube 19. A small amount of phosphorus may be produced for the removal of which material such as copper which form non-volatile phosphorous compounds may be provided in the tube 19, or elsewhere.

After this process the tube 19 is preferably immersed in a cooling agent such as liquid air or even an ice and salt mixture whereby substantially all the phosphorous pentoxid vapor is condensed in this tube which may then be sealed off at 23. In some cases it may remain in connection with the main envelop as the small amount of vapor of phosphorous pentoxid may do no harm for some work. A trace of phosphorous pentoxid remaining if no cooling agent has been used before sealing off may later rapidly be used up by heating the auxiliary filament 8 again to a high temperature.

By this method pressures less than .000001 mm. of mercury may be produced. The small gaseous residue consists mainly of inert gases such as argon, krypton or the like which have no appreciable effect upon an electron discharge, whereas other gases which would have a deleterious effect in an electron discharge device even when of this low pressure, are completely removed.

In order to render hydrogen chemically active, it is not necessary that the conductor should be heated to a very high temperature. Even platinum when heated to about 1500° C. renders hydrogen susceptible to oxidation as above described. Usually filament temperatures nearer 2000° C. are preferable.

Certain novel features of thermionic discharge devices and their operation are described and claimed by me in the above mentioned renewal application Serial No. 84,242 and application Serial No. 876,432, filed December 10, 1914. Although certain aspects of the inventions described and claimed in the other application are also described in the present application, I desire to make no claim thereto in the present application. In another renewal application Serial No. 84,241, renewed March 14, 1916, also involved in interference certain structural aspects common to the grid device shown in Fig. 2 are described and claimed.

What I claim as new and desire to secure by Letters Patent of the United States, is,—

1. The method of removing gases from an inclosed space which consists in heating metallic tungsten in said space to such temperature that the metal is actively vaporized, and continuing the vaporization of tungsten until by chemical combination gases having chemical affinity are combined with the tungsten vapor to form solid compounds.

2. The method of producing high vacua which consists in reducing the gaseous pressure in the space to be evacuated until the atmosphere in said space has become highly attenuated and then vaporizing metallic tungsten in said space to combine with residual gases.

3. The method of removing residual gases from an exhausted space which consists in vaporizing metallic tungsten in said space in the presence of phosphorous pentoxid.

4. In the process of completing the evacuation of a space containing a highly attenuated atmosphere consisting at least in part of hydrogen, the step which consists in introducing into said space an anhydrous oxid of phosphorus and electrically incandescing in said space a refractory conductor whereby the hydrogen is rendered chemically active with respect to said oxid and is oxidized.

5. In the process of completing the evacuation of a space containing a highly attenuated atmosphere consisting at least in part of hydrogen, the step which consists in introducing into said space a reducible compound and vaporizing in said space a body of tungsten whereby gases other than hydrogen are removed by chemical combination with tungsten and hydrogen is in part removed by the tungsten and in part by said reducible compound.

6. The process which consists in reducing the gaseous pressure of a space to be highly evacuated to at least about .05 mm. of mercury, introducing into said space anhydrous oxid of phosphorus, vaporizing in said space metallic tungsten thereby chemically fixing gaseous residues in the space to be evacuated, and removing an excess of said oxid of phosphorus by refrigeration.

7. The process of completing evacuation of a space containing a highly attenuated atmosphere which consists at least in part of hydrogen, which consists in introducing into said space an anhydrous oxid of phosphorus and vaporizing in said space metallic tungsten whereby gases other than hydrogen are removed by chemical combination with tungsten and hydrogen is in part removed by the tungsten vapor and in part by chemical combination with the oxid of phosphorus.

In witness whereof, I have hereunto set my hand this 14th day of May, 1914.

IRVING LANGMUIR.

Witnesses:
 HELEN ORFORD,
 WM. A. ROGERS.